US006761439B2

(12) United States Patent
Hoen et al.

(10) Patent No.: US 6,761,439 B2
(45) Date of Patent: *Jul. 13, 2004

(54) MAGNETICALLY-ACTUATED FLUID CONTROL VALVE

(75) Inventors: Storrs T. Hoen, Brisbane, CA (US); Naoto Kawamura, Corvallis, OR (US); Jonah A. Harley, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/930,098

(22) Filed: Aug. 14, 2001

(65) Prior Publication Data

US 2001/0050705 A1 Dec. 13, 2001

Related U.S. Application Data

(63) Continuation of application No. 09/287,507, filed on Apr. 7, 1999, now Pat. No. 6,325,354.

(51) Int. Cl.[7] ................................................ B41J 2/175
(52) U.S. Cl. ....................................................... 347/85
(58) Field of Search .............................. 347/85, 86, 87, 347/84

(56) References Cited

U.S. PATENT DOCUMENTS 4,460,905 A * 7/1984 Thomas ........................ 347/54
5,980,028 A * 11/1999 Seccombe ..................... 347/85
6,325,354 B1 * 12/2001 Hoen et al. ................... 251/65

* cited by examiner

Primary Examiner—Michael Nghiem
(74) Attorney, Agent, or Firm—Marc P. Schuyler

(57) ABSTRACT

This disclosure provides a valve which is controlled by a magnetic actuator. More specifically, the actuator is a polarized, magnetic actuator, that is, a magnetic actuator containing both a permanent magnet and an electromagnet. The actuator can be an inexpensive commercial relay having a pivoting armature that pushes a compliant diaphragm against a valve seat to close the valve. Preferably, the armature is configured as a "see-saw," such that as the valve is opened, an opposing end of the see-saw also displaces the diaphragm. In this manner, fluid pressure in a valve chamber is relatively constant, and there are no significant pressures which prevent the valve from opening and closing. The preferred application of the valve is to actively drive printer ink supply, such that ink can be selectively drawn using the valve from a remote ink supply into a local ink reservoir, mounted near a print head. A sensor at the local reservoir is used to detect air or low pressure, and causes the valve to open and draw more ink into the local reservoir.

3 Claims, 4 Drawing Sheets

US 6,761,439 B2

MAGNETICALLY-ACTUATED FLUID CONTROL VALVE

CROSS REFERENCE TO RELATED APPLICATION(S)

This is a continuation of application Ser. No. 09/287,507 now U.S. Pat. No. 6,325,354 filed on Apr. 7, 1999, which is hereby incorporated by reference herein.

The present invention relates to valves. More particularly, this disclosure provides a magnetically-actuated fluid control valve.

BACKGROUND

Applications of valves in high-performance fluidics control often require quick response time, small size, long life, and operation under a wide range of fluid flows; often, valves meeting these criteria are required to provide hundred micron throws with several grams of force while closed.

Magnetically-actuated valves are one class of valves which can satisfy these criteria, and an example of such a valve is provided by U.S. Pat. No. 5,085,402. While these magnetically-actuated valves are useful for their intended purposes, one limiting factor in their application is their generally high cost. This high cost may unacceptably drive up cost of a final product, especially in the case of consumer products, where price can critically govern sales.

There are other classes of valves which potentially can provide throws having sufficient force (e.g., piezoelectric valves), but these valves generally are too large and expensive when constructed to meet the criteria mentioned above. Furthermore, piezoelectric valves often require a large driving voltage, which can unacceptably increase power supply requirements.

A need exists for a magnetically-actuated valve that is relatively inexpensive to produce. Ideally, such a valve should be extremely reliable, providing millions of cycles of repetition during the valve's lifetime. Such a valve should provide strong throws with response time on the order of milliseconds or better. Finally, such a valve should ideally be small. The present invention satisfies these needs and provides further, related advantages.

SUMMARY

The present invention solves the aforementioned needs by providing a low-cost, high-performance valve. A valve made according to the present invention utilizes a polarized, magnetic actuator, preferably using a commercial electric relay. Because of today's market demands, these relays are today both mass-produced and relatively inexpensive. Use of a properly sized relay and other valve components enables fabrication of a valve having zero leak rate, small form factor, and very long lifetime. It is expected that such a valve can be manufactured for a small fraction of the cost of the magnetically-actuated and piezoelectric valves mentioned above, and so, a valve according to the present invention should have ready applicability to consumer markets which have previously not been amenable to the use of high-performance valves.

One form of the invention provides a valve that uses a polarized, magnetic actuator to open and close a valve head against a valve seat. In one detailed aspect of the invention, this actuator uses a pivoting armature which is operatively connected to the valve head, causing it to seal against the valve seat or open as the actuator is driven. Preferably, the actuator can be an electric relay that uses a pivoting "see-saw" armature, and a compliant diaphragm; use of either side of the armature to displace the compliant diaphragm enables opening and closing of the valve without significantly changing fluid volume within the valve. In this manner, the actuator can be configured such that the force imposed by the fluid balances in both pivotal directions of the armature, such that there are no significant fluid pressures which act against opening or closing of the valve.

In another form of the invention, the valve uses a magnetic actuator having a pivoting armature to open and close a valve head against a valve seat.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 1 is an illustrative diagram which shows an off-axis ink supply used for a printer or plotter. In particular, FIG. 1 shows a remote reservoir, a pen body, and a supply line which carries ink from the remote reservoir to the pen body.

FIG. 2 is a schematic diagram of a pressure regulator used in the pen body seen in FIG. 1; in particular, FIG. 2 shows use of the preferred valve as part of a feedback loop that helps maintain ink at the proper pressure within the pen body seen in FIG. 1.

FIG. 3 is a perspective diagram showing the layout of components within the pen body of FIG. 1.

FIG. 4 is a schematic diagram used to explain basic operation of the preferred valve, and shows a fluid inlet, a fluid chamber and a fluid outlet. In FIG. 4, a magnetic actuator having a permanent magnet controls an armature to normally impede entry of fluid through the inlet.

FIG. 5 is an illustrative diagram similar to FIG. 4, but which illustrates actuation of to open the valve and permit flow into the fluid chamber.

FIG. 6 is a perspective view of the outside of the preferred embodiment, including a top layer which mounts the inlet, the outlet and a fluid chamber (not seen in FIG. 6), two interface layers, and a bottom block which mounts the magnetic actuator.

FIG. 7 is a cross-sectional diagram of the preferred embodiment, taken along lines 7—7 of FIG. 6. The four layers introduced in FIG. 4 are slightly separated for purposes of illustrate, and are assembled together in the manner indicated by bold arrows at the right side of FIG. 7.

FIG. 8 is a perspective view similar to FIG. 6, but which shows the four layers separated, with the top block inverted. The four layers are assembled together as indicated by several bold arrows, via a conventional heat staking process, connection bolts, or via other conventional means.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of a valve, namely, one which uses a magnetic actuator having a permanent magnet. The invention, however, may also be applied to other types of systems as well.

While the preferred valve described below has many applications to fluid control, the preferred application of the valve is to printers, and ink jet printers in particular. The environment for the preferred valve in ink supply will first be discussed, followed by additional details regarding the preferred valve.

I. Preferred Application of The Valve

Ink jet printers offer a mechanism for producing high print quality using inexpensive print materials. Typically, a print head includes a silicon substrate having hundreds of tiny jets per inch, each ejecting droplets of ink under the control of a microprocessor. This print head is usually mounted within a movable pen, which travels on a carriage directly over a paper conveyance path. In black-and-white printing, a single ink supply and print head is used, whereas two to four ink supplies and associated pens are normally used in color printing. Conventionally, in home printers, the ink supply is contained directly in each pen, and the pen usually must be completely replaced when the ink is gone. In larger ink jet printers used in some businesses, the ink supply is usually removed from the pen (so-called off-axis printing) due to the large ink supply required.

In both home and commercial applications, the cost of printing can be significantly affected by the need to occasionally replace the ink cartridge and its attached print head. This cost is somewhat lessened with off-axis printing since a relatively larger ink supply may be used (requiring less frequent ink replenishment) and may be more easily replaced using a removable, remote reservoir. Also, with the reservoir detached from the print head, the print head does not need to be replaced each time the ink reservoir is replaced.

One logistical problem in off-axis printing, however, is that it becomes more difficult to regulate the pressure of the ink supplied to the print head, sometimes called the pen "back pressure." Importantly, the ink near the print head is usually held slightly less than atmospheric pressure, to avoid any tendency of the ink to drool from ink jet spray nozzles. At the same time, a minimum ink pressure usually must be maintained in order to reliably print.

Figure 1:
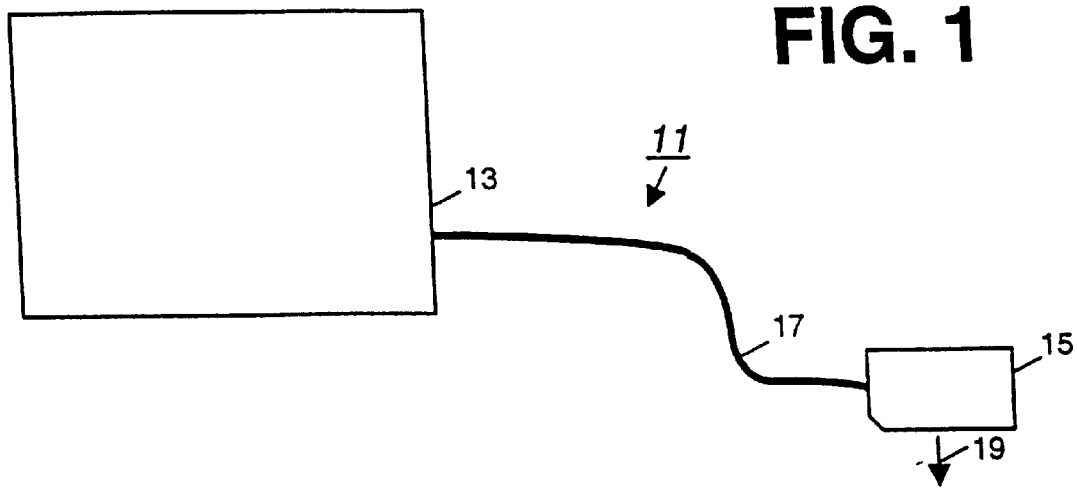
FIGS. 1–3 are used to explain the preferred use of the valve discussed herein.
Figure 2:
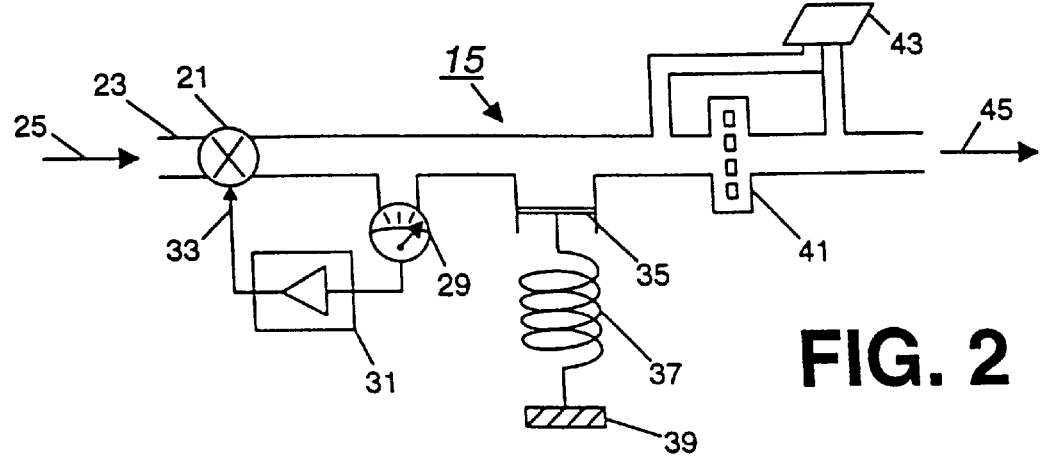
Figure 3:
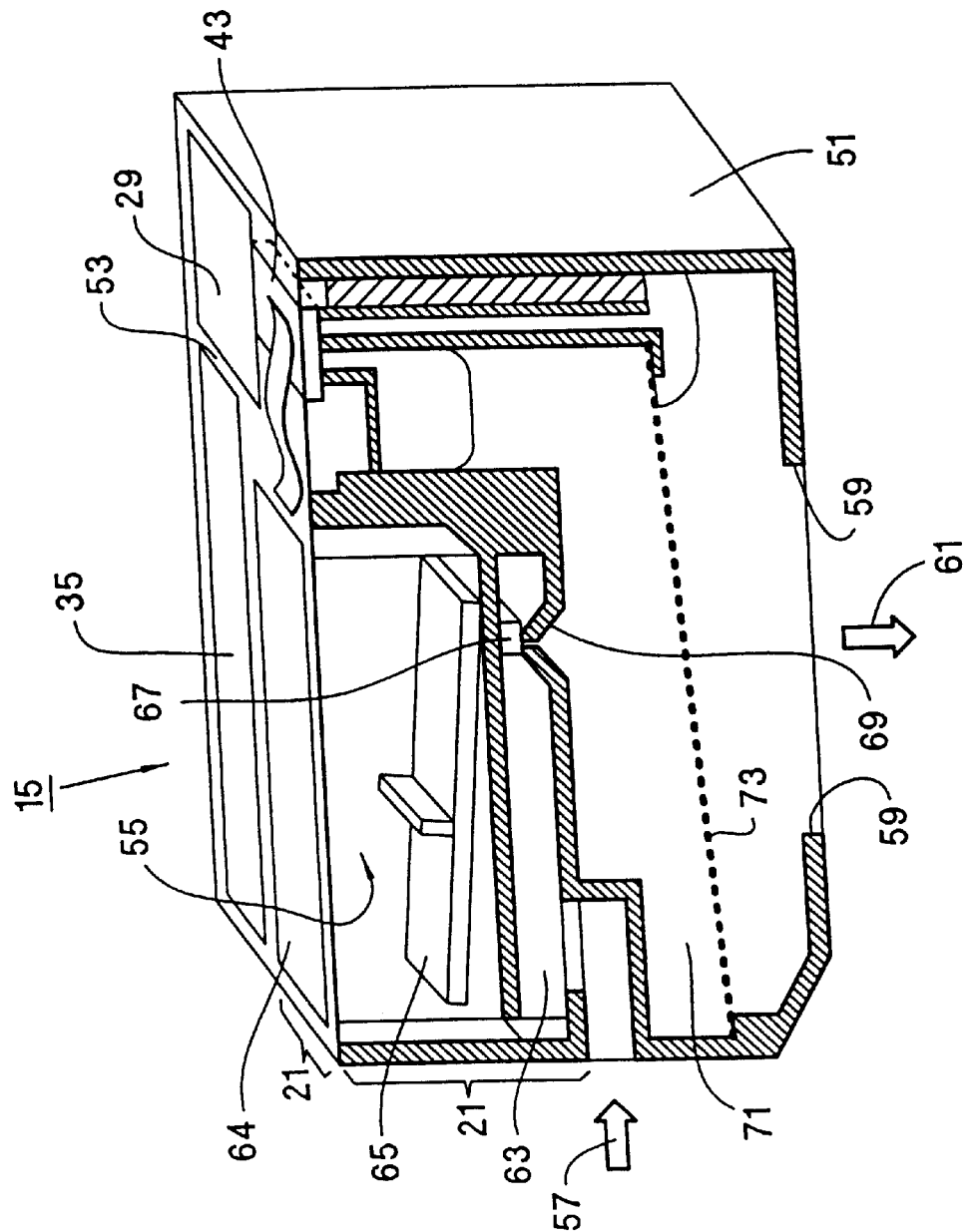

Several mechanisms have traditionally been used to passively regulate back pressure including spring bags, foam mechanisms and bladders, for example, as seen in U.S. Pat. Nos. 5,650,811, 4,771,295 and 5,852,459. However, as just stated, these conventional mechanisms are all passive. By contrast, the preferred use of the present invention is as a valve used to actively regulate pressure in an ink delivery mechanism, as part of an active feedback loop. FIGS. 1–3 are used to explain ink delivery and the usage of such a feedback loop.

As seen in FIG. 1, a preferred ink delivery system 11 includes a remote reservoir 13, a pen 15, and a supply line 17 which carries ink from the reservoir to the pen. A print head (mounted to the bottom of the pen) ejects ink as indicated by a directional arrow 19. Importantly, this preferred delivery mechanism provides a supply intended for a full range of printers, from desktop printers used at home or work to larger printers used by businesses, e.g., drum-based and poster-size printers. That is to say, with a convenient, low-cost means for reliably and actively regulating pen back pressure in a print head, it should be possible to use off-axis printing in home printer applications, in addition to business printing applications.

The pen preferably includes a pressure regulator including four primary elements: (1) an electrically controlled valve, preferably an electromagnetic valve; (2) a pressure sensor; (3) an electrically controlled feedback loop which uses the signal of the pressure sensor to control the valve; and (4) a compliant element that maintains the pressure within the pen during the response time of the valve. This pressure regulator is used to control the back pressure of the ink near the nozzles of an ink jet pen.

These four elements are shown schematically in FIG. 2, which shows preferred usage of an electromagnetic valve 21 in actively controlling ink within the pen 15. In particular, ink from a pressurized supply enters an ink flow path 23, as indicated by a directional arrow 25. The ink flows through the electromagnetic valve 21 and into a region in contact with the pressure sensor 29, which in turn provides an electric output signal to a computer-controlled (i.e., microprocessor-controlled) feedback path 31. This path is monitored by the computer (not separately illustrated in FIG. 2) to preferably keep ink pressure at the sensor 29 between 0.5 to ten inches of water below ambient atmospheric pressure, and the computer controls the voltage and current of the electromagnetic valve 21 as represented by signal 33 to cause the valve to open and close as necessary. Preferably, the electromagnetic valve 21 is polarized, and is configured to be normally closed unless a driving signal is applied to deliberately open or close the valve.

Ink from the valve 21 also flows into contact with a compliant element 35, which is schematically represented using a spring 37 and relative housing 39. Also shown in FIG. 2 are a filter 41, which may be necessary in some embodiments to protect the print head from stray particles, and an air management port 43, which may be necessary to allow air to be purged from the regulator. Finally, ink exits the flow path as indicated schematically by an arrow 45, by provision of the ink to the print head (not shown in FIG. 2).

The mechanical layout of a pen implementing a valve of the present invention is illustrated in additional detail in FIG. 3. In particular, the body of the pen 15 is seen to be of roughly rectangular geometry and to include a rigid exterior housing 51. FIG. 3 illustrates a perspective view which reveals components located at a top side 53 of the pen, and interior components visible through a front lateral side 55 of the pen. Ink enters the pen 15 as indicated by an ingress arrow 57 from the remote reservoir (not seen in FIG. 3). As needed, ink is also dispensed through the print head (also not seen in FIG. 3) through a bottom port 59 of the pen, as indicated by an egress arrow 61.

Upon entering the pen, ink from the remote reservoir is delivered into fluid chamber 63 of the electromagnetic valve 21. Preferably, the valve is driven by an electric relay 64 which is based on a permanent magnet actuator, such as set forth in U.S. Pat. Nos. 5,673,012, 5,617,066, 5,337,029 and 5,162,764. Generally, these relays use both an electromagnet and a permanent magnet that cause a "see-saw" type armature to pivot in either of two pivotal directions. As seen in FIG. 3, for example, the armature 65 is pivoted clockwise in a manner that it pushes a valve head 67 closed against a valve seat 69, to prevent ink from flowing. The computer-controlled feedback path can, however, selectively open the valve, to allow ink to re-pressurize the pen. When this happens, ink flows though the valve into a pen local reservoir 71 which makes up the majority of the pen's remaining interior. Ink from the remote reservoir will normally either be pressurized or supplied via a gravity feed, such that all that is necessary to replenish ink is to pivot the armature 65 to remove the valve head 67 from the valve seat, thereby permitting fluid to flow through the valve seat and into the pen local reservoir. Once admitted to the pen local reservoir, the ink passes through a ten micron nylon mesh filter 73 to remove stray particles and settles adjacent the bottom port, ready for use by the print head.

During printing, the print head (not seen in FIG. 3) fires ink droplets under computer-control as would be conventional. As ink is removed from the pen local reservoir 71, however, sensed pressure drops. The computer (e.g., the print control microprocessor, not seen in FIG. 3) monitors this pressure and responsively opens the valve 21 to admit more ink to avoid excessive pressure drop (e.g., beyond ten inches of water below ambient atmosphere). The use of a polarized, magnetic actuator such as relay 64 permits valve response time on the order of milliseconds, with a strong throw, making it well-suited for keeping pressure tightly regulated in the ink flow path.

As seen in FIG. 3, the top side 53 of the pen 15 also reveals two other components that are in direct contact with the ink, including the pressure sensor 29 and the compliant element 35.

The preferred method of measuring ink pressure is to use a commercial pressure sensor to directly measure pressure, for example, using sensors such as those fabricated by Lucas Novasensor, Exar, or Motorola; the "NPH" series of pressure sensors available from Lucas Novasensor, in particular, has demonstrated good preliminary results. These commercial pressure sensors tend to provide high sensitivity and relatively fast response time. Direct pressure measurement is not the only contemplated means of measuring pressure, however, and other, alternative examples of suitable pressure sensors include a capacitive pressure sensor or a capillary network formed of foam or glass beads. Examples of the former are given by U.S. patent application Ser. No. 09/114,978 now U.S. Pat. No. 6,060,681 for "Bubble Valve and Bubble Valve-Based Pressure Regulator, filed on Jul. 14, 1998, and Ser. No. 09/116,427 now U.S. Pat. No. 5,369,736 for "Passive Pressure Regulator for Setting the Pressure of a Liquid to a Predetermined Pressure Differential Below a Reference Pressure," filed on Jul. 14, 1998, both assigned to the same assignee as this disclosure. An example of the latter, capillary network sensor, is given by U.S. patent application Ser. No. 09/221,636 now U.S. Pat. No. 6,212,956 for "High Output Capacitive Gas/Liquid Detector," also assigned to the same assignee as the present invention.

The compliant element 35 is utilized because ink and similar fluids are substantially incompressible. When the valve is closed and ink is fired from the print head, the volume of ink within the pen decreases. The compliant element helps ensure that small changes in the volume of ink do not cause a large change in pressure which affects the firing of ink from the print head. The required compliance depends on the response time of the valve and the desired regulation range. In the preferred embodiment, the response time of the valve is on the order of milliseconds, the flow rates are approximately ten milliliters per minute, and the desired regulation range is a few tenths of an inch of water. Given these values, one skilled in the art may readily select an appropriate compliant element.

In one embodiment, for example, the compliant element 35 may be a deliberately designed air bubble within the pen body. For example, a one cubic centimeter air bubble should provide sufficient compliance for the pressure to be maintained adequately. Other embodiments may include a spring attached to a flexible boundary between the ink and atmosphere (e.g., via use of spring bag), a rubber membrane, a capillary network, or a movable boundary between the ink reservoir and a reservoir of fluid held at a different pressure.

The computer-controlled feedback path is preferably used for more than just maintaining ink pressure at a particular value. For example, a computer may use sensed pressure characteristics (including air presence) and print head efficiency information to change the back pressure of the ink. The ink back pressure which yields the highest print quality varies from print head to print head and is dependent on the ink characteristics, ink flow rate, and paper type. Electrical control of the back pressure permits each pen to be finetuned to increase print quality and printer though put. To perform this task, each pen is preferably measured for optimal print performance either during production or electronically by the printer during pen life, to calculate a specific back pressure; this pressure is then stored in the computer (print control microprocessor) memory and is used in connection with the pressure sensor 29 to precisely control pen back pressure in each pen. Electrical control of the feedback path allows the pen to be occasionally disabled for additional functionality, such as, calibration of the pressure sensor, priming of the print head, detection of air, and purging of air from the system.

The computer-controlled feedback path and other elements of an ink delivery system are additionally described by U.S. patent application Ser. No. 09/287,500, now U.S. Pat. No. 6,318,851 for a "Method And System For Purging Ink From A Print Mechanism," filed on the same date as the present disclosure on behalf of inventors Storrs T. Hoen and Jonah A. Harley and assigned to the same assignee as the present invention; this copending Patent Application is incorporated herein by reference, as though identically reproduced herein.

Having discussed the preferred use of a valve made according to this disclosure, the layout and fabrication of a preferred valve will now be described in additional detail. Importantly, it is expected that a valve made according to this disclosure can be both quite small and made at a fraction of the cost of many currently-available magnetic actuators; for example, it is anticipated that the valve indicated in FIG. 3 can be produced for less than two U.S. dollars, and to have dimensions such that an entire pen has a height of two centimeters or less. The ability to produce such a high-performance low-cost valve should render it quite feasible to incorporate small, high-performance valves in many consumer applications, not just in printers.

II. Operation Of The Preferred Valve

This preferred embodiment is a fluid control valve which uses a magnetic actuator having a permanent magnet. The valve is designed to be compatible with a variety of fluids including both dye-based and pigment based inks.

Figure 4:
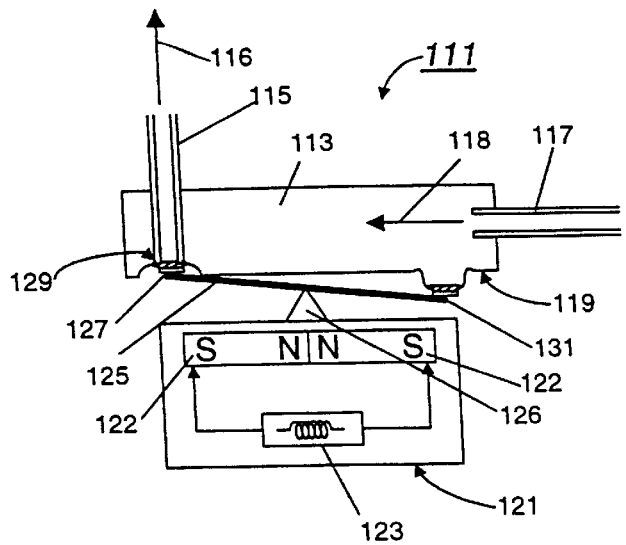
FIGS. 4–8 are used to explain the operation and fabrication of the preferred valve.
Figure 5:
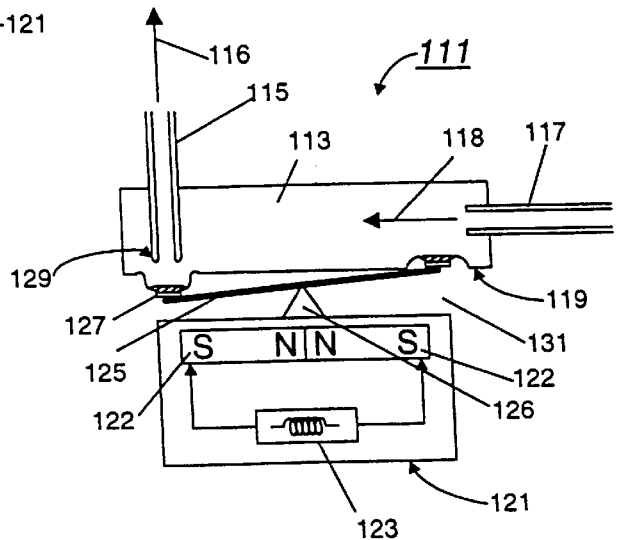
Figure 6:
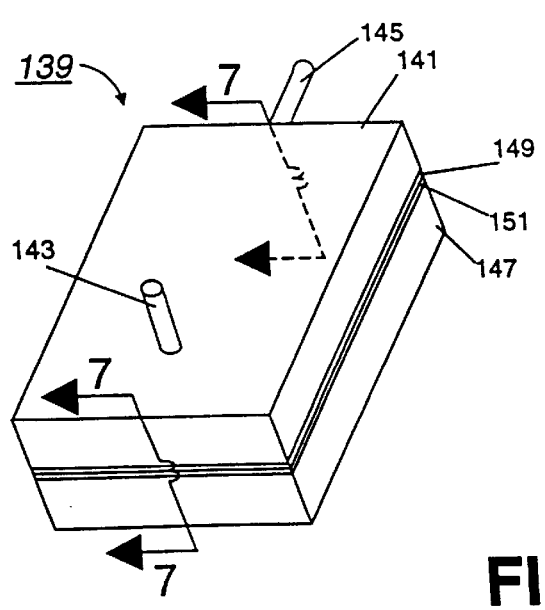
Figure 7:
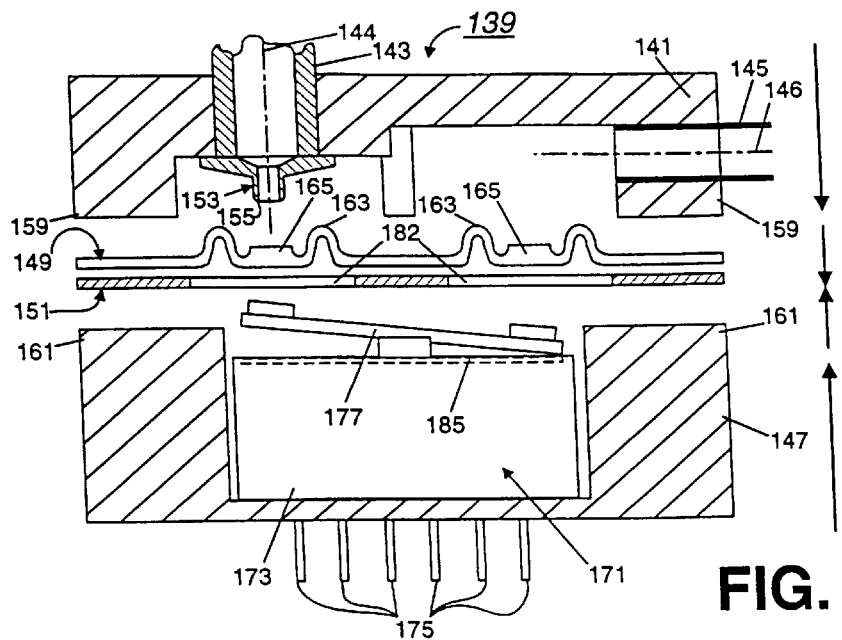
Figure 8:
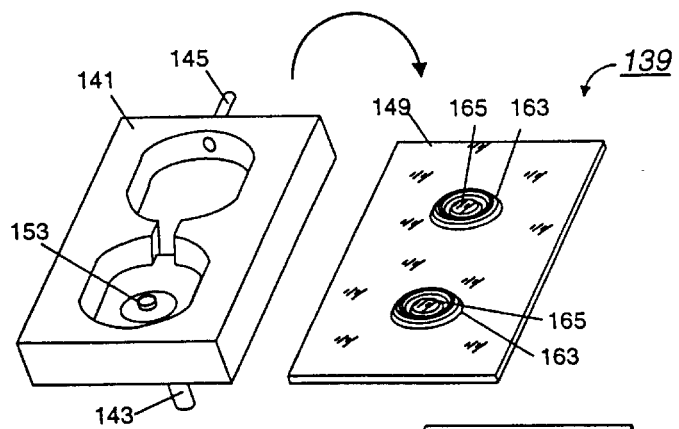
Figure 8:
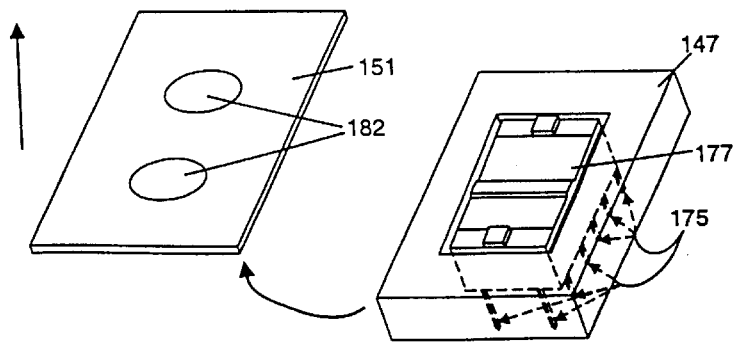

FIGS. 4–5 are schematic diagrams showing basic operation of the preferred valve and, in particular, show how a commercial electric relay is used to drive the preferred valve. FIGS. 6–8, by contrast, show the appearance of the preferred valve.

Importantly, FIGS. 4–5 describes preferred approach in which the relay is protected from the fluid by a compliant diaphragm. However, it is also possible to design a relay that is encapsulated, such that it may be directly used to provide the valve head without an intervening diaphragm. Since the use of a customized relay increases the cost substantially, it is preferred to use a commercial electric relay and diaphragm.

A schematic drawing of the preferred valve 111 is shown in FIG. 4. In this drawing, the valve is shown as including a fluid chamber which receives fluid from an inlet 117 and provides fluid to an outlet 115, as indicated by flow arrows 116 and 118. The valve also includes a compliant diaphragm 119 and a polarized magnetic actuator, that is, an actuator having a permanent magnet such as electric relay 121. The actuators of electric relays can be quite compact, and the use of a permanent magnet in addition to an electromagnet enable the relays to provide more forceful throws than would be conventional for similarly-sized actuators. For example, model number TQ2-5V made by Aromat or model no. V23106-J2001-820 1 made by Siemans, are approximately fourteen by nine by five millimeters and provide 400 micron throws with forces on the order of 5 grams. The market requirements of commercial electric relays help ensure that the actuator meets the response time and lifetime requirements of the desired high performance valve. An additional benefit is that it is relatively straightforward to change the operating voltage of the valve since several models of a given relay with the same overall dimensions are usually commercially produced to operate at different supply voltages. The preferred relay is the Aromat model TQ2-5V, mentioned above, although Aromat, Siemans and Omron all make a variety of models which may be preferred in particular applications.

As seen in FIG. 4, the relay includes a main body which houses the electromagnet 123, and an armature 125 which pivots as a see-saw about a central pivot point 126. A first end of the armature is attached to the compliant diaphragm 119 and indirectly to a soft, 0.5 millimeter silicone rubber nipple 127 (which, with the compliant diaphragm forms the valve head), and a second end of the armature also couples to the diaphragm and a similar nipple 131. The first end of the armature and a valve seat 129 are each on opposite sides of the compliant diaphragm 119 such that, as the valve opens and closes, the nipple 127 is displaced into and out of contact with the valve seat.

Importantly, the relay is drawn to show two magnets 122 disposed at either end of the relay, which may also be thought of as a three-pole single permanent magnet. That is to say, the relay is preferably mounted such that the armature 125 is driven by both an electromagnet (i.e., the magnetic block 123) and a permanent magnet 122 to elevate either end of the armature. FIG. 4 represents a valve closed position, since the valve seat is shown to be impeded by the compliant diaphragm and the first end of the armature.

FIG. 5 is a schematic diagram similar to FIG. 4, but instead shows an open valve position, where fluid is permitted to pass through the valve seat 129. Importantly, while fluid flow can either be in the directional sense indicated by flow arrows 116 and 118 or an opposite sense, it is generally preferred to use direction shown because positive pressure is then present within the valve body, which helps push the compliant diaphragm against the armature 125.

Importantly, it also will be noticed in FIGS. 4–5 that the diaphragm 119 is connected symmetrically to the two ends of the armature 125. This design is deliberate, as helps ensure that forces applied by fluid inside the valve cancel. That is to say, force provided by the fluid acts upon both ends of the armature 125, such that the armature is unbiased by fluid pressure. Accordingly, the compliant diaphragm, the soft rubber nipple, and their attachment to the relay armature are all configured with this end in mind.

FIG. 6 presents a perspective view of the complete valve 139, showing a fluid outlet 143 and inlet 145 which are visible from the exterior of the valve, and four layers which make up the body of the preferred valve. These layers include a top, molded cover 141, which preferably is molded to include all fluid ports, and the valve seat. At the base of the complete valve 139 is a bottom, relay-housing layer 147, which is made to snugly fit the relay and permit relay connection terminals (not shown in FIG. 6) to protrude through the bottom of the valve for electrical connection; these terminals also provide vent holes so as to keep the pressure at the relay roughly atmospheric. In between these two layers are a compliant diaphragm 149 and a relay template layer 151. The compliant diaphragm is preferably made of a thin material which resists fatigue and acts as a diffusion barrier to water and air. A suitable material is "Saranex" (available from Dow-Corning); elastomeric materials such as butyl rubber, "EPDM," silicone rubber or a fluoro-elastomer may also be suitable for some applications. Together, these four layers can be either heat staked together, tightened together by means of a number of nuts and bolts, glued with epoxy, or connected by other means. Importantly, the compliant diaphragm acts as a soft sealing material, such that when the four layers are properly tightened together, the compliant diaphragm provides a complete fluidic seal that prevents any external leakage of fluid from the valve. The template layer, by contrast, supports the compliant diaphragm to properly balance the forces applied to the relay by the compliant diaphragm.

FIG. 7 shows a cross-sectional diagram of the complete preferred valve 139, and is taken along line 7—7 of FIG. 6.

The top, molded cover 141 is constructed of a rigid plastic material such as polyethylene, "polysulfone," "Delrin," or other suitable materials; it is roughly rectangular in configuration, excepting passages for fluid ports. Walls 159 of the cover are molded to help define part of the fluid chamber, which is completed when the molded cover is attached against the compliant membrane and the relay template. The fluid ports include an outlet 143 and an inlet 145, and are oriented as indicated by center lines 144 and 146. A bottom portion of the outlet defines the valve seat 153, which as mentioned, has a curved rim 155 to help provide a good seal against the compliant diaphragm 149.

The compliant diaphragm is also molded, preferably to have two flexible sealing surfaces, each with a raised annular fold 163 and a raised nipple 165. Seen directly underneath of the valve seat 153 (and aligned with the outlet's center axis 144), the nipple is displaced upward to contact and seal the valve seat, preventing the escape of fluid. The annular fold reduces the force required to displace the nipple.

Two identical sealing surfaces are provided as part of the compliant diaphragm, each sealing surface symmetrical about the center of the compliant diaphragm. This design is consistent with the principle, mentioned above, that each end of the relay armature is made such that relatively constant volume is maintained in the valve during operation, e.g., such that fluid pressure does not act against the closing of the valve during upward displacement of the compliant diaphragm against the valve seat 153.

Positioned directly beneath the compliant diaphragm is the relay template 151, which can be made of either a metal or plastic material, and which helps prevents excursion of the compliant diaphragm toward the relay. The template provides two circular openings 182, which permit the relay to contact and displace either nipple of the compliant diaphragm.

Finally, the bottom, relay-mounting layer 147 is composed of the same material as the top layer, and it also has walls 161 which define a receptacle for an electric relay 171. This receptacle is preferably sized just large enough to snugly accommodate the relay. As seen in FIG. 7, the relay includes a main body having-an internal electromagnet 173, a number of electrical terminals 175, and a pivoting armature 177. The electrical terminals permit selective driving of the relay such that it pivots in either pivotal direction, e.g., such that the valve can be driven open or closed as desired using the electromagnet positioned within the main body. The relay is also a polarized, magnetic actuator, such that it also has a permanent magnet 185, which helps generate sufficient force to open and close the valve using a small actuator.

Once all parts are aligned in the manner indicated by FIG. 7, then the relay can be directly attached to the top, molded cover layer. Very few modifications are necessary in the procurement and use of the relay. An epoxy or pressure sensitive tape should be attached to either side of the armature to attach the armature to the compliant membrane. The standard relay cover should not be attached to the relay. Some of the electrical leads may be removed, as appropriate.

With the layers aligned, they can be mounted together using a heat staking process, nuts and bolts, a suitable epoxy, and any combination of the foregoing or with another conventional attachment process.

Importantly, the force applied between the valve seat and the valve face must be large enough to ensure that the valve is leak proof. The force that the relay applies to the valve seat will depend on the pre-load amount. For a pre-load of approximately one hundred microns, the force applied by the relay is approximately four grams which should be sufficient to provide a leak proof seal of silicon rubber against the valve face.

FIG. 8 presents a perspective view of the elements just described, and helps illustrate in particular both the annular fold 163 and raised nipples 165 of the compliant diaphragm 149, as well as the circular openings 182 provided by the relay template 151.

Importantly, those skilled in electronics or valve design will recognize that modifications may readily be performed to the embodiment stated above without departing from the principles of the present invention. For example, while the use of the particular armature illustrated offers certain advantages in terms of valve operation, it may be possible to use other armature configurations to open and close a valve. Alternatively, it may be possible to use other types of polarized, magnetic actuators other than electric relays normally used for electronics applications.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. In an ink pen adapted for use in a off-axis printer having a remote ink supply, where the ink pen includes a local ink supply and a print head adapted to selectively print using ink from the local ink supply, an improvement comprising:

a valve that selectively supplies the local ink supply with ink from the remote ink supply;

wherein said valve includes a fluid inlet adapted to receive ink from the remote ink supply, a fluid chamber having a valve seat and a valve head, and a fluid outlet adapted to feed ink into the local ink supply from the fluid chamber;

wherein said fluid chamber is bounded by a compliant diaphragm, said valve being prefabricated to receive a magnetic actuator having two reciprocal actuator elements that operatively couple to the compliant diaphragm to displace the compliant diaphragm in a reciprocal manner upon selective actuation of the magnetic actuator, said compliant diaphragm coupled to one of the valve seat and the valve head to perform one of selective opening and selective closing of the valve in response to actuation of the magnetic actuator, such that volume of the fluid chamber is kept substantially constant notwithstanding actuation of the actuator and opening or closing of the valve.

2. An improvement according to claim 1 wherein the magnetic actuator is an electric relay.

3. An improvement according to claim 1 wherein the magnetic actuator is an unencapsulated electric relay.

* * * * *